United States Patent
Sugimoto et al.

(10) Patent No.: US 7,809,084 B2
(45) Date of Patent: Oct. 5, 2010

(54) SIGNAL RECEIVING CIRCUIT AND SIGNAL INPUT DETECTION CIRCUIT

(75) Inventors: Hirokazu Sugimoto, Osaka (JP); Toru Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 965 days.

(21) Appl. No.: 11/597,794

(22) PCT Filed: Feb. 1, 2005

(86) PCT No.: PCT/JP2005/001408

§ 371 (c)(1),
(2), (4) Date: Nov. 28, 2006

(87) PCT Pub. No.: WO2005/117421

PCT Pub. Date: Dec. 8, 2005

(65) Prior Publication Data

US 2008/0247492 A1 Oct. 9, 2008

(30) Foreign Application Priority Data

May 28, 2004 (JP) ............................. 2004-159669

(51) Int. Cl.
*H03K 9/00* (2006.01)
(52) U.S. Cl. ..................................................... 375/316
(58) Field of Classification Search .................. 375/316
See application file for complete search history.

(56) References Cited

U.S. PATENT DOCUMENTS

| 3,851,335 | A | * | 11/1974 | Elliott | 360/26 |
| 4,048,481 | A | * | 9/1977 | Bailey et al. | 714/41 |
| 4,468,529 | A | * | 8/1984 | Samuel et al. | 379/114.26 |
| 4,525,667 | A | * | 6/1985 | Sawano et al. | 324/140 R |
| 4,591,744 | A | * | 5/1986 | Koike | 327/18 |
| 4,723,237 | A | * | 2/1988 | Andrew et al. | 370/204 |
| 5,426,390 | A | * | 6/1995 | Yabe et al. | 327/172 |
| 5,436,579 | A | * | 7/1995 | Tran | 326/98 |
| 2002/0029355 | A1 | * | 3/2002 | Sakamoto et al. | 713/503 |
| 2002/0175721 | A1 | * | 11/2002 | Kanda et al. | 327/141 |

FOREIGN PATENT DOCUMENTS

| JP | 2001-94890 A | 4/2001 |
| JP | 2004-40208 A | 2/2004 |
| JP | 2004-040208 A | 2/2004 |

OTHER PUBLICATIONS

Japanese Notice of Reasons for Rejections, w/ English translation thereof, issued in Japanese Patent Application No. JP 2006-513806 dated Jul. 14, 2009.

* cited by examiner

*Primary Examiner*—Juan A Torres
(74) *Attorney, Agent, or Firm*—McDermott Will & Emery LLP

(57) ABSTRACT

In a signal receiving circuit there are provided N input detection circuits 2a to 2n for receiving clock signals S1-c to SN-c included in N channels of signals S1 to SN. Each of the input detection circuits 2a to 2n detects the transition of the input signal of the corresponding channel and further confirms that the signal of the corresponding channel is being received after the transition detection to thereby detect the input of the signal of the corresponding channel. The selection circuit 3 selects and outputs the clock signal and the data signal in the signal of the channel of which the input is detected. The selected output signal is successively subjected to input processes through one each of the phase synchronization circuit 4, the serial/parallel conversion circuit 5, etc., which are shared by N channels.

7 Claims, 6 Drawing Sheets

SIGNAL RECEIVING CIRCUIT AND SIGNAL INPUT DETECTION CIRCUIT

RELATED APPLICATIONS

This application is the U.S. National Phase under 35 U.S.C. §371 of International Application No. PCT/JP2005/001408, filed on Feb. 1, 2005, which in turn claims the benefit of Japanese Application No. 2004-159669, filed on May 28, 2004, the disclosures of which Applications are incorporated by reference herein.

TECHNICAL FIELD

The present invention relates to a signal receiving circuit for receiving signals from a plurality of channels and performing a predetermined input signal process on these signals.

BACKGROUND ART

In recent years, video display devices of rapidly growing popularity, such as plasma displays and liquid crystal displays, are increasingly required to have a plurality of signal receiving interfaces, as more and more video signal supplying devices, such as DVD players, set top boxes being digital broadcast receivers or personal computers, are connected thereto, so that a plurality of such video signal supplying devices can be connected to a video display device.

Patent Document 1 discloses a conventional configuration of a video interface device of a single video display device for receiving video signals from a plurality of video signal supplying devices as described above. An important part of the video interface disclosed in Patent Document 1 will be described with reference to FIG. 5. A video interface device A includes three input signal processing sections C-1, C-2 and C-3 for receiving three channels of video signals B-1, B-2 and B-3 from three video supplying devices (not shown), and a video selection circuit E for selecting a video signal of one channel from among video signals D-1, D-2 and D-3 obtained by performing an input process by the three input signal processing sections C-1 to C-3. The video selection circuit E receives a video switch signal CH-SEL based on a remote controller operation by the operator, for example, from outside, and selects the video signal of one intended channel according to the switch signal CH-SEL.

Patent Document 1: Japanese Laid-Open Patent Publication No. 2004-40208

DISCLOSURE OF THE INVENTION

Problems to be Solved by the Invention

However, with the video interface device A disclosed in Patent Document 1, although only one video signal is selected by the video selection circuit E, there are provided three input signal processing sections C-1 to C-3 corresponding to the number of channels of the video signals B-1 to B-3. The input signal processing sections C-1 to C-3 have the same internal configuration. As shown in FIG. 6 with respect to the input signal processing section C-1, for example, in a case where the video signal B-1 includes a clock signal B-1C and a data signal B-1D, the input signal processing section includes a receiver Ca and a PLL circuit Cb for the clock signal B-1C, a receiver Cc for the data signal B-1D, a phase synchronization circuit Cd for phase synchronization between the clock signal B-1C and the data signal B-1D, a serial/parallel conversion circuit Ce for performing a serial/parallel conversion on the video signal from the phase synchronization circuit Cd, and an alignment circuit Cf for aligning the data train of the video signal from the conversion circuit Ce. Where the data signal B-1D includes a plurality of data signals, a plurality of data signal receivers are required for the data signals, and the phase synchronization circuit Cd, the serial/parallel conversion circuit Ce and the alignment circuit Cf each require a large-scale configuration for accommodating the plurality of data signals.

Thus, with the conventional video interface device, it has been found that in the input signal processing sections (C-2 and C-3) other than the input signal processing section (e.g., C-1) for the video signal selected by the video selection circuit E, even if the video signals B-2 and B-3 are not being input, components from the receivers Ca and Cc to the alignment circuit Cf shown in FIG. 6 are in a stand-by operation with a stand-by current therethrough, resulting in a large amount of wasteful power consumption. The wasteful power consumption is particularly significant where a data signal of each channel includes a plurality of data signals.

Moreover, the conventional video interface device has a very large circuit scale as it requires the same number of input signal processing sections C-1 to C-3 as the number of channels of the input video signals, as described above.

The present invention has been made based on this technical problem, and a first object of the present invention is to provide a signal receiving circuit having a plurality of input channels, wherein the stand-by operation is no longer necessary for input processing circuits of those channels where there is no signal input, thereby reducing the power consumption.

A second object of the present invention is to reduce a plurality of input processing circuits to a shared circuit to thereby reduce the circuit area.

Means for Solving the Problems

In order to achieve the first object, the present invention provides a configuration where the presence/absence of a signal input from a channel is detected, so that it is possible to allow for an operation of an input processing circuit corresponding to the channel for which there is a signal input while stopping the stand-by operation of input processing circuits corresponding to channels for which there is no signal input.

In order to achieve the second object, the present invention provides a configuration where some input processing circuits are reduced to a shared circuit based on the fact that it is not necessary to provide a plurality of input processing circuits for all of a plurality of channels, i.e., some input processing circuits are not necessary, in the configuration as described above where the operation is allowed for only for an input processing circuit corresponding to a channel for which there is a signal input.

Specifically, a signal receiving circuit of the present invention is a signal receiving circuit for receiving a signal separately for each of a plurality of channels, the signal receiving circuit including: a plurality of signal input detection circuits corresponding to the plurality of channels, each receiving a signal of the corresponding channel for detecting a transition of the input signal and confirming that the signal of the corresponding channel is being received after the detection of the transition of the signal to thereby detect an input of the signal of the corresponding channel; and one or more input processing circuits each following a corresponding one of the signal input detection circuits for receiving the signal of the channel detected by the signal input detection circuit to perform a predetermined input signal process on the received signal.

In the signal receiving circuit of the present invention, the signal of each channel includes a clock signal and a data signal in a predetermined synchronized relationship with the clock signal.

In the signal receiving circuit of the present invention, the data signal of each channel includes a plurality of data signals.

In the signal receiving circuit of the present invention, each of the signal input detection circuits includes: a PLL circuit for receiving the clock signal from the corresponding channel and outputting a multiplied clock signal obtained by multiplying the original clock signal by a predetermined multiplier; a transition detection circuit for receiving the original clock signal and detecting a transition of the original clock signal to thereby output a transition detection signal; and a lock detection circuit, which is activated upon receiving the transition detection signal of the transition detection circuit, for determining whether the PLL circuit has been locked based on the original clock signal and the multiplied clock signal of the PLL circuit to thereby output a lock detection signal.

In the signal receiving circuit of the present invention, the PLL circuit outputs the multiplied clock signal to the input processing circuit.

In the signal receiving circuit of the present invention, the PLL circuit is activated only after receiving the transition detection signal of the transition detection circuit.

In the signal receiving circuit of the present invention, the signal receiving circuit includes a selection circuit following the signal input detection circuits for selecting a signal of a channel of which an input is detected by one of the signal input detection circuits, wherein the input processing circuit is a 1-channel input processing circuit following the selection circuit for performing a predetermined input signal process on the signal of the channel selected by the selection circuit.

In the signal receiving circuit of the present invention, the input processing circuit at least includes a serial/parallel conversion circuit for performing serial/parallel conversion of a signal.

A signal input detection circuit of the present invention is a signal input detection circuit for detecting an input of a signal of a predetermined channel, wherein the signal input detection circuit receives a signal of the channel for detecting a transition of the input signal and confirming that the signal of the corresponding channel is being received after the detection of the transition of the signal to thereby detect an input of the signal of the corresponding channel.

In the signal input detection circuit of the present invention, the signal of the channel includes a clock signal and a data signal; and the signal input detection circuit includes: a PLL circuit for receiving the clock signal included in the signal of the channel and outputting a multiplied clock signal obtained by multiplying the original clock signal by a predetermined multiplier; a transition detection circuit for receiving the original clock signal included in the signal of the channel and detecting a transition of the original clock signal to thereby output a transition detection signal; and a lock detection circuit, which is activated upon receiving the transition detection signal of the transition detection circuit, for determining whether the PLL circuit has been locked based on the original clock signal and the multiplied clock signal of the PLL circuit to thereby output a lock detection signal.

In the signal input detection circuit of the present invention, the PLL circuit outputs the multiplied clock signal to outside the signal input detection circuit.

In the signal input detection circuit of the present invention, the PLL circuit is activated only after receiving the transition detection signal of the transition detection circuit.

As described above, the signal receiving circuit of the present invention is a signal receiving circuit receiving a plurality of channels of input, wherein the signal input of each channel is detected by a corresponding signal input detection circuit. Therefore, for each channel for which there is no signal input, the stand-by operation of the corresponding input processing circuit can be stopped based on the output of the corresponding signal input detection circuit. Thus, it is possible to reduce the power consumption.

Particularly, with the signal receiving circuit of the present invention, in a case where there is only a signal input from one of a plurality of channels, the plurality of input processing circuits corresponding to the plurality of channels can be reduced to a shared input processing circuit, thus eliminating the other input processing circuits and achieving a significant reduction in the circuit area.

Moreover, with the input signal detection circuit of the present invention, the input signal detection circuit has a transition detection function and a signal input confirmation function. Therefore, even if noise is superimposed on the signal of the channel or if the signal input discontinues, the noise will not be detected erroneously as a signal input and the detection of the signal input will not become indeterminate, whereby it is possible to enhance the reliability of the signal input detection.

EFFECTS OF THE INVENTION

As described above, the signal receiving circuit of the present invention is a signal receiving circuit receiving a plurality of channels of input, wherein the signal input is detected separately for each channel. Therefore, it is possible to stop the stand-by operation of each input processing circuit corresponding to a channel for which there is no signal input. Thus, it is possible to reduce the power consumption.

Particularly, with the signal receiving circuit of the present invention, the plurality of input processing circuits corresponding to the plurality of channels can be reduced to a shared input processing circuit, thus achieving a significant reduction in the circuit area.

Moreover, with the input signal detection circuit of the present invention, even if noise is superimposed on the signal of the channel or if the signal input discontinues, the noise will not be detected erroneously as a signal input and the detection of the signal input will not become indeterminate, whereby it is possible to enhance the reliability of the signal input detection.

DESCRIPTION OF REFERENCE NUMERALS

Figure 1:
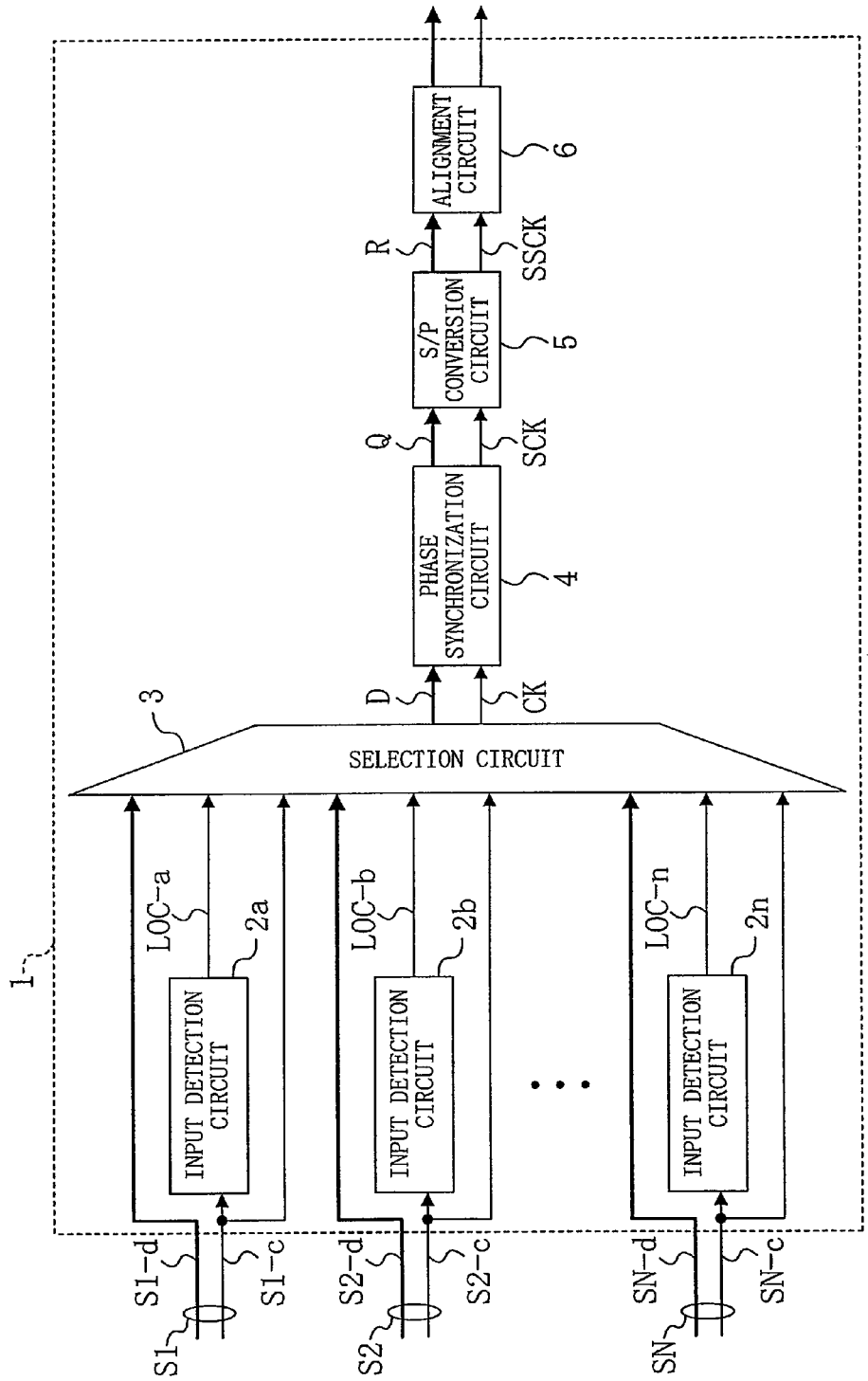
FIG. 1 A circuit diagram showing a configuration of a signal receiving circuit according to a first embodiment of the present invention.

1 Signal receiving circuit
2a to 2n. Input detection circuit (signal input detection circuit)
3 Selection circuit
4 Phase synchronization circuit (input processing circuit)
5 Serial/parallel conversion circuit (input processing circuit)
6 Alignment circuit (input processing circuit)
S1 to SN Video signal
S1-c to SN-c Clock signal (original clock signal)
S1-d to SN-d Data signal
LOC-a to LOC-n Lock detection signal
10 Transition detection circuit
11 PLL circuit
11a to 11n Multiplied clock signal
12 Lock detection circuit
MOV-a Transition detection signal

BEST MODE FOR CARRYING OUT THE INVENTION

A signal receiving circuit according to an embodiment of the present invention will now be described with reference to the drawings.

First Embodiment

FIG. 1 shows a general configuration of a signal receiving circuit according to a first embodiment of the present invention.

A signal receiving circuit 1 shown in the figure receives N channels of signals S1, S2 . . . SN from N video signal supplying devices (not shown), e.g., a DVD player, a set top box (digital broadcast receiver), a personal computer, etc. Each of the channels of signals S1 to SN includes a clock signal S1-c to SN-c and a data signal S1-d, S2-d . . . SN-d in a predetermined synchronized relationship with the corresponding clock signal. Each of the data signals S1-d to SN-d includes a plurality of data signals.

The signal receiving circuit 1 includes therein N input detection circuits (signal input detection circuits) 2a to 2n corresponding to the N channels of signals S1 to SN. The input detection circuits 2a to 2n receive the clock signals S1-c to SN-c of the signals S1 to SN of the corresponding channels to each detect the transition of the clock signal and confirms that the clock signal continues to be input after the detection of the transition thereof, thereby detecting the input of the signal S1 to SN of the corresponding channel based on the transition detection and the signal input confirmation. The input detection circuits 2a to 2n have the same internal configuration, which will be discussed below with reference to FIG. 2 using the input detection circuit 2a as an example.

Figure 2:
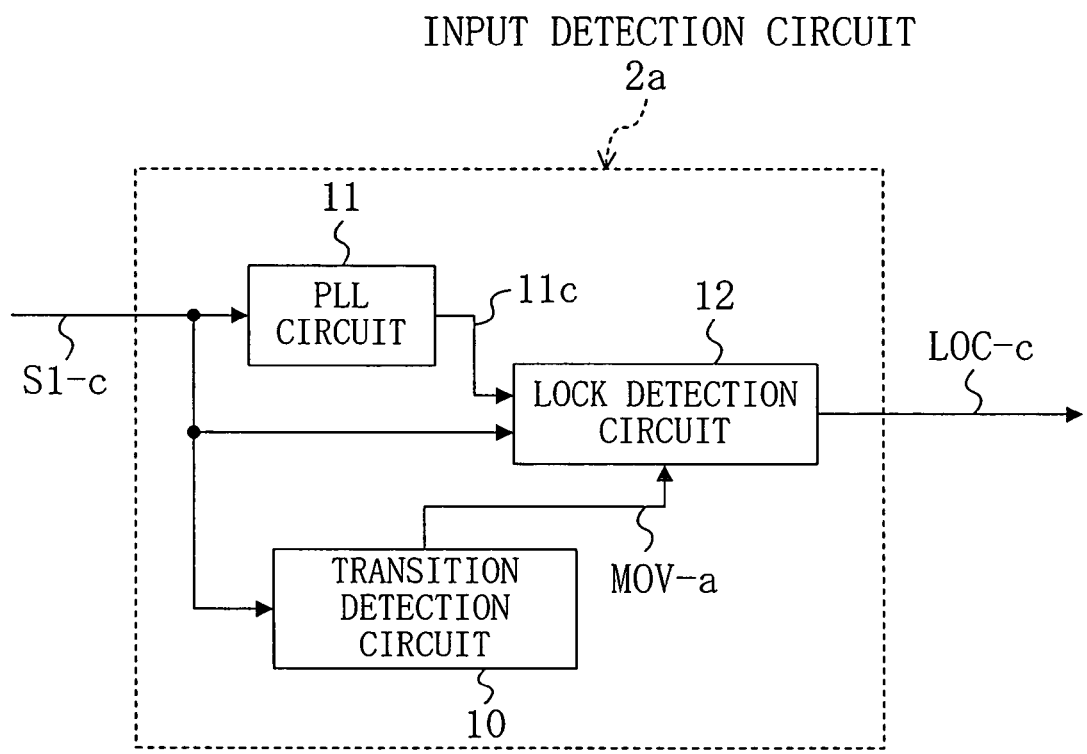
FIG. 2 A circuit diagram showing an internal configuration of an input detection circuit provided in the signal receiving circuit.

Referring to FIG. 2, the input detection circuit 2a includes a transition detection circuit 10, a PLL circuit 11, and a lock detection circuit 12. The transition detection circuit 10 includes an integration circuit having a predetermined time constant, receiving the corresponding clock signal S1-c input thereto. When the transition of the input signal is greater than or equal to the predetermined time constant, the transition detection circuit 10 determines that the transition is that of the clock signal S1-c to output a transition detection signal MOV-a.

The PLL circuit 11 receives the original clock signal S1-c included in the corresponding video signal S1 and multiplies the original clock signal S1-c by a predetermined multiplier to output a multiplied clock signal 11c. Moreover, the lock detection circuit 12 is activated only after receiving the transition detection signal MOV-a from the transition detection circuit 10. The lock detection circuit 12 includes two sets of counters (not shown), wherein one set receives the original clock signal S1-c of the corresponding video signal S1 and the other set receives the multiplied clock signal 11c from the PLL circuit 11. Whether the PLL circuit 11 has been locked is determined based on whether the output value of the last counter from each set matches the other after counting a predetermined number of clocks of the original clock signal S1-c in the activated state, i.e., after receiving the transition detection signal MOV-a from the transition detection circuit 10. When lock is detected, a lock detection signal LOC-c is output, and then the input of the video signal of the corresponding channel is detected. The detection precision of the lock detection circuit 12 can be enhanced by increasing the number of counters.

The rest of the configuration of the signal receiving circuit shown in FIG. 1 will now be described. Referring to FIG. 1, a selection circuit 3 is provided following the n input detection circuits 2a to 2n. The selection circuit 3 receives lock detection signals LOC-a to LOC-n from the N input detection circuits 2a to 2n. When the lock detection signal LOC-a to LOC-n is received from any of the input detection circuits 2a to 2n, i.e., when the input of the video signal of the corresponding channel is detected, the selection circuit 3 selects the clock signal and the data signal in the video signal of the channel of which an input is detected, and outputs the selected signals to the subsequent section. Although not shown, if there are a plurality of channels of which the input is detected, a switch signal based on a remote controller operation by the operator is input to the selection circuit 3, based on which a video signal can be selected from among the channels of video signals of which the input is detected.

Following the selection circuit 3, there are provided one set (one channel) of, but not N sets of, a phase synchronization circuit 4, a serial/parallel conversion circuit 5 and an alignment circuit 6 in this order in the downstream direction as the input processing circuits. The phase synchronization circuit 4 receives the clock signal CK and the data signal D of the video signal selected by the selection circuit 3, and adjusts the phase between the signals CK and D so that the data signal D can be latched desirably, for example. The serial/parallel conversion circuit 5 converts the clock signal SCK and the data signal Q, being serial data, from the phase synchronization circuit 4 into parallel data of a plurality of bits. The alignment circuit 6 receives the clock signal SSCK and the data signal R from the serial/parallel conversion circuit 5 and detects a fixed pattern therein, e.g., a preamble pattern, to align the data train based on the fixed pattern.

Thus, in the present embodiment, there are N input detection circuits 2a to 2n provided for N channels, and the input detection circuits 2a to 2n output the lock detection signals LOC-a to LOC-n when detecting the corresponding video signals S1 to SN. When a lock detection signal (e.g., LOC-a) is received from one of the N input detection circuits 2a to 2n, the selection circuit 3 selects the clock signal S1-c and the data signal S1-d included in the video signal S1 from the input detection circuit 2a from which the lock detection signal is received, and outputs the selected signals to the subsequent section. The selected and output signals, i.e., the clock signal S1-c and the data signal S1-d, are then subjected to a predetermined input process through the phase synchronization circuit 4, the serial/parallel conversion circuit 5 and the alignment circuit 6.

Herein, the selection circuit 3 selects the video signal from one input detection circuit of which the video signal input is detected, from among the N input detection circuits 2a to 2n for N channels, and the selected video signal is successively subjected to input processes through one each of the phase synchronization circuit 4, the serial/parallel conversion circuit 5 and the alignment circuit 6. Thus, it is not necessary to provide N sets of these input processing circuits 4, 5 and 6 for N channels. Therefore, as compared with a conventional configuration, the stand-by current consumed by (N−1) sets of the input processing circuits 4, 5 and 6 is saved. Thus, it is possible to reduce the power consumption.

Moreover, the input processing circuits 4, 5 and 6 can be shared by N channels and the number thereof can thus be reduced from N to one, thus allowing for a significant reduction in the circuit area.

While only one each of the input processing circuits 4, 5 and 6 is provided as described above in the present embodiment, the present invention encompasses cases where N sets of the input processing circuits 4, 5 and 6 are provided, separately for different channels, following the corresponding input detection circuits 2a to 2n. Then, with the configuration where the N input detection circuits 2a to 2n output the lock detection signals LOC-a to LOC-n, respectively, if any of the input detection circuits 2a to 2n does not output the corresponding lock detection signal LOC-a to LOC-n, the stand-by operation of the input processing circuits 4, 5 and 6 of the corresponding channel can be stopped. In this case, although the arrangement of the input processing circuits 4, 5 and 6 requires as much circuit area as does a conventional configuration, the stand-by current for the inoperative input processing circuits 4, 5 and 6 can be saved. Thus, it is possible to reduce the power consumption.

A characteristic operation of the input detection circuits 2a to 2n will now be described. In a case where the PLL circuit 11 and the lock detection circuit 12 are not provided and only the transition detection circuit 10 is provided in the input detection circuit 2a shown in FIG. 2, if the clock signal S1-c is temporarily contaminated by noise, or the like, for example, the transition of the noise, or the like, may be erroneously detected as the input of the clock signal. In the present embodiment, however, if the transition detection circuit 10 erroneously outputs the transition detection signal MOV-a, the following occurs. Although the lock detection circuit 12 is activated, the value of the input signal (contaminating noise) multiplied by the PLL circuit 11 by a predetermined multiplier does not match that of the contaminating noise in the lock detection circuit 12, whereby the lock detection signal LOC-c will not be output, unlike when the clock signal S1-c is input (normal state). Therefore, the clock signal input is detected with a high precision.

If, for example, the transition detection circuit 10 is not provided in the input detection circuit 2a of FIG. 2, the lock detection circuit 12 operates as a counter while the clock signal S1-c is being received, but may transition into an indeterminate state when the input of the clock signal S1-c discontinues, depending on how it discontinues. In the present embodiment, however, if the input of the clock signal S1-c discontinues while the lock detection circuit 12 is outputting the lock detection signal LOC-c, the transition detection circuit 10 stops outputting the transition detection signal MOV-a to reset the lock detection circuit 12, for example, thereby preventing the transition into an indeterminate state.

Therefore, with a configuration where the transition of the clock signal S1-c is detected by the transition detection circuit 10 and the lock detection circuit 12 confirms that the video signal of the corresponding channel (particularly, the clock signal) after the signal transition is detected, as in the input detection circuit 2a shown in FIG. 2, it is possible to prevent the erroneous detection due to noise contamination or the transition into an indeterminate state.

Second Embodiment

Figure 3:
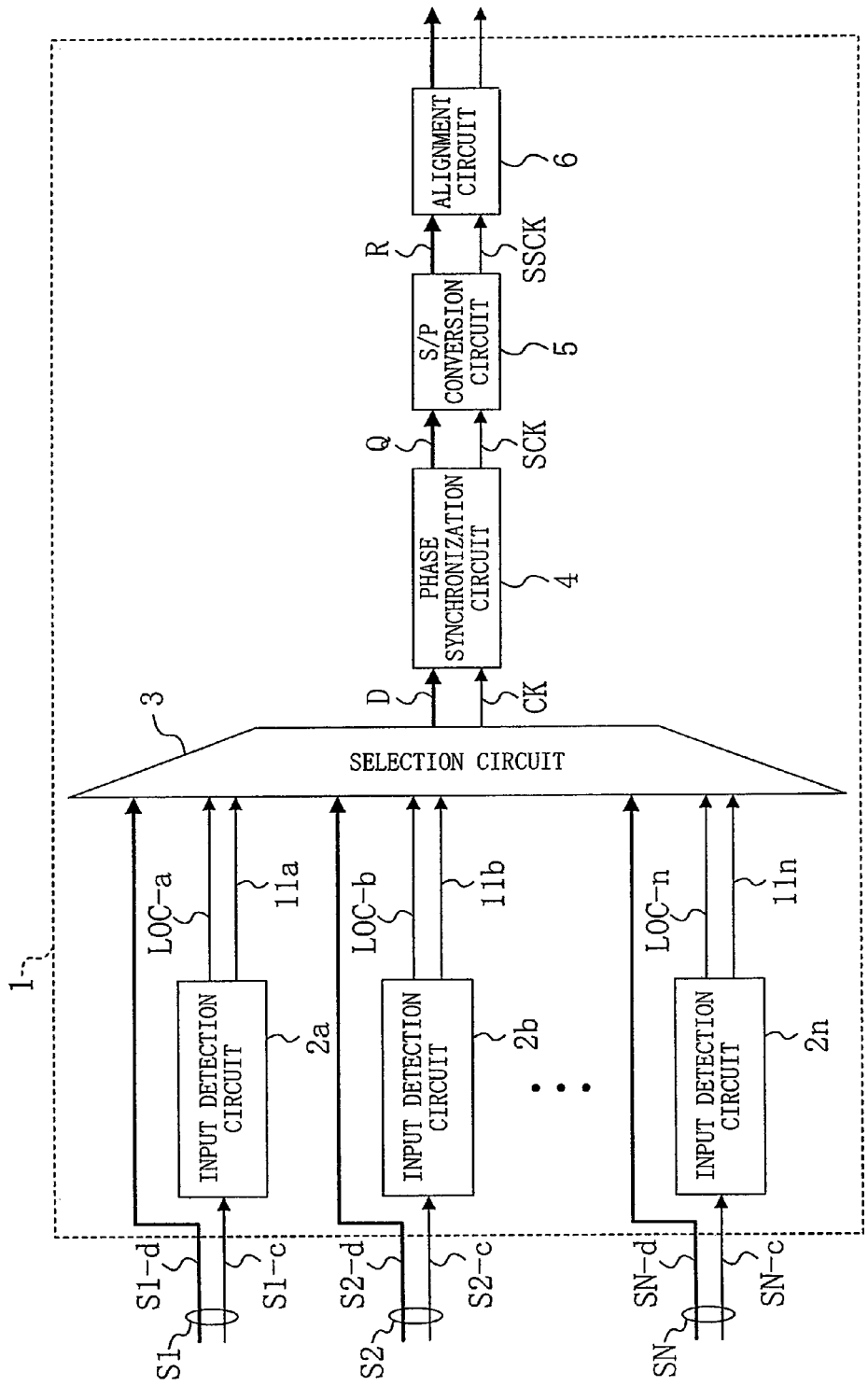
FIG. 3 A circuit diagram showing a configuration of a signal receiving circuit according to a second embodiment of the present invention.

A second embodiment of the present invention will now be described with reference to FIGS. 3 and 4.

In the first embodiment, the clock signal input to the selection circuit 3 is the original clock signal S1-a to S1-n included in the channel. In the present embodiment, it is instead the multiplied clock signal 11a to 11n, which has been multiplied by a predetermined multiplier by the PLL circuit 11 of the input detection circuit 2a to 2n.

Typically, in a data transmission standard, the transfer rate of a clock signal differs from that of a data signal, and the clock signal needs to be multiplied. From this point of view, in the present embodiment, the multiplied clock signals 11a to 11n of the PLL circuit 11 are used, thus sharing the PLL circuit 11 as a device for multiplying the clock signal.

Figure 4:
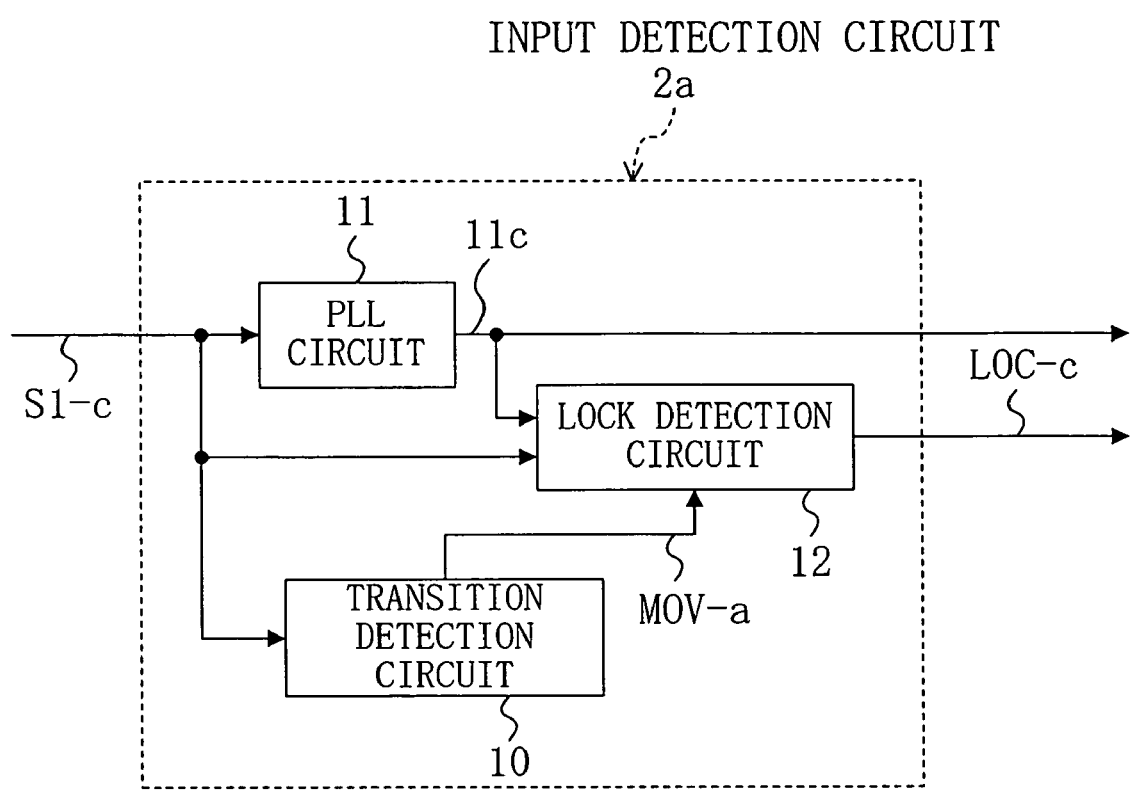
FIG. 4 A circuit diagram showing an internal configuration of an input detection circuit provided in the signal receiving circuit.
Figure 5:
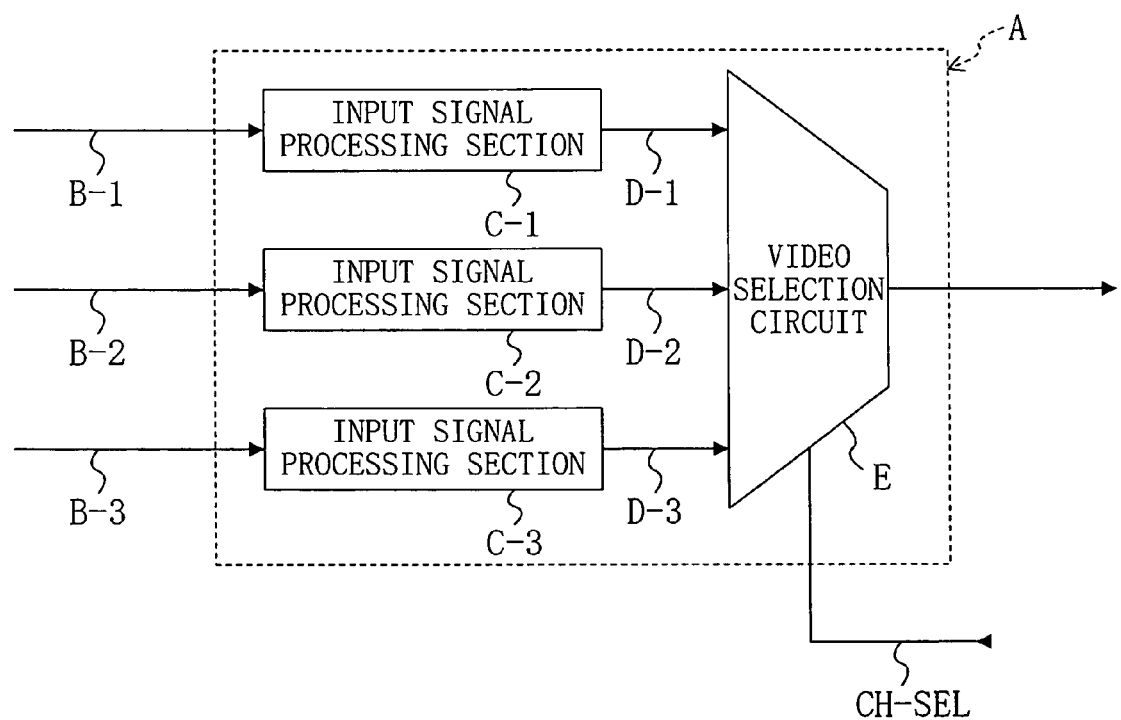
FIG. 5 A diagram showing a configuration of an interface portion of a conventional signal receiving circuit.
Figure 6:
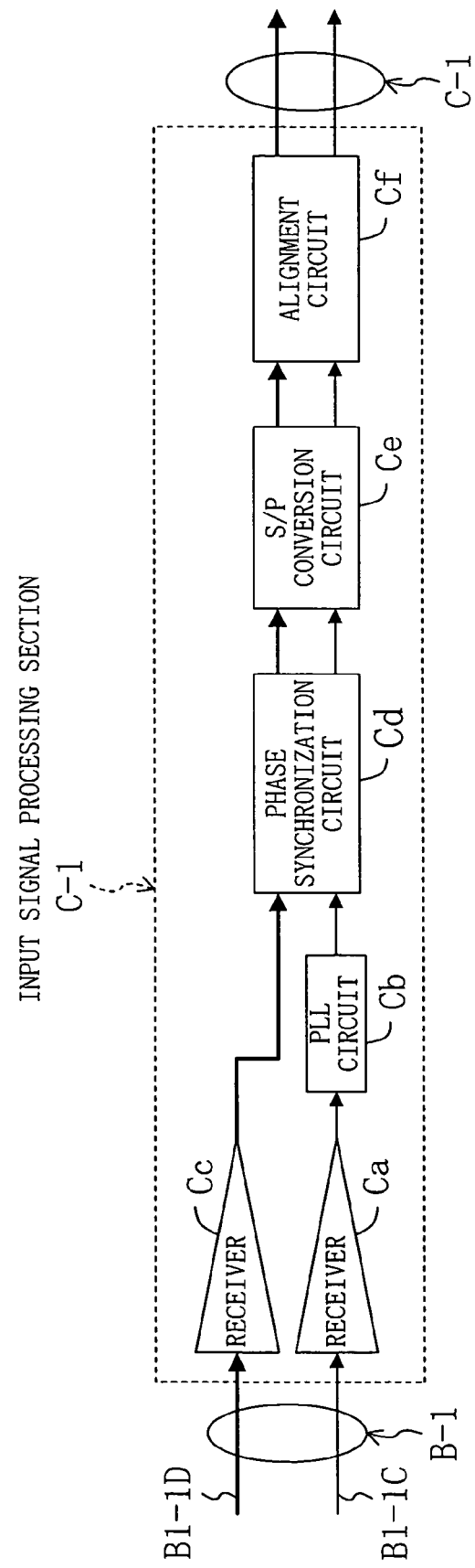
FIG. 6 A circuit diagram showing an example of an internal configuration of an input signal processing section provided in the interface portion.

In the first and second embodiments, the transition detection signal MOV-a of the transition detection circuit 10 is output only to the lock detection circuit 12 in the input detection circuit 2a shown in FIGS. 2 and 4. Alternatively, it may be output also to the PLL circuit 11 so that the PLL circuit 11 will not be activated until the PLL circuit 11 receives the transition detection signal MOV-a, whereby it is possible to prevent the self-excited oscillation of the PLL circuit 11. Thus, a further reduction in the power consumption can be expected.

Moreover, while the input detection circuits 2a to 2n detect the input of a video signal by receiving the clock signals S1-c to SN-c included in the video signals S1 to SN in the above description, the present invention is not limited to the configuration of the input detection circuits 2a to 2n receiving the clock signal. For example, where the video signal includes only the data signal but not the clock signal, the video signal (data signal) may be received, as opposed to the configuration of the input detection circuit of FIGS. 2 and 4. That is, the configuration of the input detection circuit is not limited to a particular configuration as long as it detects the transition of the input signal and confirms that the signal of the corresponding channel is being received after the detection of the transition of the input signal, thus detecting the input of the signal of the corresponding channel.

INDUSTRIAL APPLICABILITY

As described above, with the signal receiving circuit of the present invention, the stand-by operation of any input processing circuit of a channel for which there is no signal input can be stopped, and moreover a plurality of input processing circuits can be reduced to a smaller number of shared input processing circuits, thereby allowing for a reduction in the power consumption or a reduction in the circuit area. Thus, the present invention is useful as a data transfer system, or the like, for which a reduction in the power consumption or a reduction in the circuit area is required.

Moreover, with the input signal detection circuit of the present invention, even if noise is superimposed on the signal of the channel or if the signal input discontinues, noise will not be detected erroneously as a signal input and the detection of the signal input will not become indeterminate, whereby it is possible to enhance the reliability of the signal input detection. Thus, the present invention is useful as a signal detection circuit provided in a data transfer system, or the like.

The invention claimed is:

1. A signal receiving circuit for receiving a signal separately for each of a plurality of channels, the signal receiving circuit comprising:
a plurality of signal input detection circuits corresponding to the plurality of channels, each receiving a signal of the corresponding channel for detecting a transition of the input signal and confirming that the signal of the corresponding channel is being received after the detection of the transition of the signal to thereby detect an input of the signal of the corresponding channel; and
one or more input processing circuits each following a corresponding one of the signal input detection circuits for receiving the signal of the channel detected by the signal input detection circuit to perform a predetermined input signal process on the received signal;
wherein the signal of each channel includes a clock signal and a data signal in a predetermined synchronized relationship with the clock signal, and
wherein each of the signal input detection circuits includes:
a PLL circuit for receiving the clock signal from the corresponding channel and outputting a multiplied clock signal obtained by multiplying the original clock signal by a predetermined multiplier;
a transition detection circuit for receiving the original clock signal and detecting a transition of the original clock signal to thereby output a transition detection signal; and
a lock detection circuit, which is activated upon receiving the transition detection signal of the transition detection circuit, for determining whether the PLL circuit has been locked based on the original clock signal and the multiplied clock signal of the PLL circuit to thereby output a lock detection signal.

2. The signal receiving circuit of claim 1, wherein the PLL circuit outputs the multiplied clock signal to the input processing circuit.

3. The signal receiving circuit of claim 1, wherein the PLL circuit is activated only after receiving the transition detection signal of the transition detection circuit.

4. The signal receiving circuit of claim 1, further comprising a selection circuit following the signal input detection circuits for selecting a signal of a channel of which an input is detected by one of the signal input detection circuits,
wherein the input processing circuit is a 1-channel input processing circuit following the selection circuit for performing a predetermined input signal process on the signal of the channel selected by the selection circuit.

5. A signal input detection circuit for detecting an input of a signal of a predetermined channel, wherein the signal input detection circuit receives a signal of the channel for detecting a transition of the input signal and confirming that the signal of the corresponding channel is being received after the detection of the transition of the signal to thereby detect an input of the signal of the corresponding channel;
wherein:
the signal of the channel includes a clock signal and a data signal; and
the signal input detection circuit includes:
a PLL circuit for receiving the clock signal included in the signal of the channel and outputting a multiplied clock signal obtained by multiplying the original clock signal by a predetermined multiplier;
a transition detection circuit for receiving the original clock signal included in the signal of the channel and detecting a transition of the original clock signal to thereby output a transition detection signal; and
a lock detection circuit, which is activated upon receiving the transition detection signal of the transition detection circuit, for determining whether the PLL circuit has been locked based on the original clock signal and the multiplied clock signal of the PLL circuit to thereby output a lock detection signal.

6. The signal input detection circuit of claim 5, wherein the PLL circuit outputs the multiplied clock signal to outside the signal input detection circuit.

7. The signal input detection circuit of claim 5, wherein the PLL circuit is activated only after receiving the transition detection signal of the transition detection circuit.

* * * * *